(12) United States Patent
Hoenzsch et al.

(10) Patent No.: US 11,586,433 B2
(45) Date of Patent: Feb. 21, 2023

(54) PIPELINE RELEASE VALIDATION

(71) Applicant: Ally Financial Inc., Detroit, MI (US)

(72) Inventors: Josef Hoenzsch, Detroit, MI (US); Joynal Abedin, Warren, MI (US); William Aaron McDonald, Macomb, MI (US)

(73) Assignee: Ally Financial Inc., Detroit, MI (US)

( * ) Notice: Subject to any disclaimer, the term of this patent is extended or adjusted under 35 U.S.C. 154(b) by 0 days.

(21) Appl. No.: 17/194,843

(22) Filed: Mar. 8, 2021

(65) Prior Publication Data
US 2022/0283801 A1   Sep. 8, 2022

(51) Int. Cl.
| | |
|---|---|
| *G06F 8/71* | (2018.01) |
| *G06F 21/57* | (2013.01) |
| *G06F 8/60* | (2018.01) |
| *G06F 11/36* | (2006.01) |

(52) U.S. Cl.
CPC ............ *G06F 8/71* (2013.01); *G06F 8/60* (2013.01); *G06F 11/3672* (2013.01); *G06F 21/577* (2013.01); *G06F 2221/033* (2013.01)

(58) Field of Classification Search
CPC .......... G06F 8/60; G06F 8/71; G06F 11/3672; G06F 21/577; G06F 2221/033
See application file for complete search history.

(56) References Cited

U.S. PATENT DOCUMENTS

| | | | |
|---|---|---|---|
| 6,944,849 B1* | 9/2005 | Glerum | G06F 11/3688 717/127 |
| 7,146,608 B1* | 12/2006 | Newman | G06F 8/71 714/E11.207 |
| 9,092,586 B1* | 7/2015 | Ginetti | G06F 30/30 |
| 9,183,123 B2* | 11/2015 | Spektor | G06F 11/3466 |
| 9,910,654 B1* | 3/2018 | Brigham, II | G06F 11/3692 |
| 9,965,377 B1* | 5/2018 | Russell | G06F 8/71 |
| 10,007,674 B2* | 6/2018 | Fink | G06F 16/1873 |
| 10,289,539 B1* | 5/2019 | Arguelles | G06F 11/3664 |
| 10,318,285 B1* | 6/2019 | Jodoin | G06F 11/3612 |
| 10,613,970 B1* | 4/2020 | Jammula | G06F 8/77 |
| 10,817,283 B1* | 10/2020 | Naik | G06Q 10/103 |
| 2011/0214114 A1* | 9/2011 | Vidal | G06F 8/71 717/170 |
| 2015/0095619 A1* | 4/2015 | Dubey | G06F 11/3688 712/216 |
| 2015/0143327 A1* | 5/2015 | Holmes | G06Q 10/06 717/101 |
| 2015/0169321 A1* | 6/2015 | Rissell | G06F 11/34 717/121 |

(Continued)

*Primary Examiner* — Douglas M Slachta
(74) *Attorney, Agent, or Firm* — Holland & Hart LLP

(57) ABSTRACT

A pipeline (e.g., a DevOps or DevSecOps pipeline) may include utilities corresponding to stages within the pipeline. A device may execute the pipeline on a version of a codebase, where the version of the codebase is associated with an immutable identifier of a version control management system. The device may generate metadata for one or more of the utilities of the pipeline based executing the pipeline on the version of the codebase. The device may store the metadata at a database, where the immutable identifier is designated as a primary key for the stored metadata. The device may verify the metadata at one or more gates of the pipeline based on a comparison of the stored metadata to a set of policy information associated with the one or more gates.

20 Claims, 8 Drawing Sheets

(56) References Cited

U.S. PATENT DOCUMENTS

| | | | |
|---|---|---|---|
| 2016/0224327 A1* | 8/2016 | Angelotti | G06F 9/44521 |
| 2018/0253296 A1* | 9/2018 | Brebner | G06F 8/73 |
| 2019/0050562 A1* | 2/2019 | Rhee | G06F 21/566 |
| 2019/0080080 A1* | 3/2019 | Ogura | G06F 21/572 |
| 2020/0202006 A1* | 6/2020 | Shah | G06F 8/71 |
| 2020/0379752 A1* | 12/2020 | Rodrigues Rosa Junior | G06F 16/9014 |
| 2021/0019249 A1* | 1/2021 | Gnaneswaran | G06N 20/00 |
| 2021/0141718 A1* | 5/2021 | Sandhu | G06F 11/3688 |
| 2021/0326454 A1* | 10/2021 | Sekhar | G06F 21/44 |

* cited by examiner

PIPELINE RELEASE VALIDATION

FIELD OF TECHNOLOGY

The present disclosure relates generally to database systems and data processing, and more specifically to pipeline release validation.

BACKGROUND

A development and operations (or DevOps) pipeline (which may also be referred to as a development, security, and operations or DevSecOps pipeline) includes a set of practices implemented by development and operations teams to build, test, and deploy software. In a software development process, utilizing a DevOps pipeline may serve to maintain organization during the process. For example, a DevOps pipeline may utilize strategies such as continuous integration (also referred to herein as CI) for integrating portions of code from multiple developers into a shared code repository or database as often as possible. Continuous integration may support automatic testing of code for errors, independent of code contributed by other members.

Continuous delivery and continuous deployment are extensions of continuous integration. Continuous delivery involves the manual release or deployment of software, features, and code updates (by developers) to production in incremental portions, whereas continuous deployment involves automation of the release cycle. A DevOps pipeline may include various stages, as software moves from source code to being deployed in a particular environment. Some of these stages may include application testing stages, unit testing, integration testing, and performance testing, among others. Techniques for improving traceability for each version of a deployed codebase may be desired.

SUMMARY

The described techniques relate to improved methods, systems, devices, and apparatuses that support pipeline release validation.

A method for managing metadata is described. The method may include executing a pipeline on a version of a codebase, the pipeline comprising one or more utilities corresponding to respective stages within the pipeline, wherein the version of the codebase is associated with an immutable identifier of a version control management system, generating metadata for at least one utility of the one or more utilities of the pipeline based at least in part on executing the pipeline on the version of the codebase, storing the metadata at a database, wherein the immutable identifier is designated as a primary key for the stored metadata, and verifying the metadata at one or more gates of the pipeline based at least in part on a comparison of the stored metadata to a set of policy information associated with the one or more gates.

An apparatus for managing metadata is described. The apparatus may include a processor, memory coupled with the processor, and instructions stored in the memory. The instructions may be executable by the processor to cause the apparatus to execute a pipeline on a version of a codebase, the pipeline comprising one or more utilities corresponding to respective stages within the pipeline, wherein the version of the codebase is associated with an immutable identifier of a version control management system, generate metadata for at least one utility of the one or more utilities of the pipeline based at least in part on executing the pipeline on the version of the codebase, store the metadata at a database, wherein the immutable identifier is designated as a primary key for the stored metadata, and verify the metadata at one or more gates of the pipeline based at least in part on a comparison of the stored metadata to a set of policy information associated with the one or more gates.

Another apparatus for managing metadata is described. The apparatus may include means for executing a pipeline on a version of a codebase, the pipeline comprising one or more utilities corresponding to respective stages within the pipeline, wherein the version of the codebase is associated with an immutable identifier of a version control management system, means for generating metadata for at least one utility of the one or more utilities of the pipeline based at least in part on executing the pipeline on the version of the codebase, means for storing the metadata at a database, wherein the immutable identifier is designated as a primary key for the stored metadata, and means for verifying the metadata at one or more gates of the pipeline based at least in part on a comparison of the stored metadata to a set of policy information associated with the one or more gates.

A non-transitory computer-readable medium storing code for managing metadata is described. The code may include instructions executable by a processor to execute a pipeline on a version of a codebase, the pipeline comprising one or more utilities corresponding to respective stages within the pipeline, wherein the version of the codebase is associated with an immutable identifier of a version control management system, generate metadata for at least one utility of the one or more utilities of the pipeline based at least in part on executing the pipeline on the version of the codebase, store the metadata at a database, wherein the immutable identifier is designated as a primary key for the stored metadata, and verify the metadata at one or more gates of the pipeline based at least in part on a comparison of the stored metadata to a set of policy information associated with the one or more gates.

In some examples of the method, apparatuses, and non-transitory computer-readable medium described herein, verifying the metadata may include operations, features, means, or instructions for retrieving at least the subset of metadata based at least in part on the immutable identifier and comparing the subset of metadata to a corresponding subset of policy information for the one or more utilities, the respective stages, or both.

Some examples of the method, apparatuses, and non-transitory computer-readable medium described herein may further include operations, features, means, or instructions for configuring a set of metadata parameters for each of the one or more utilities, the respective stages, or any combination thereof, wherein the metadata may be generated based at least in part on the configured set of metadata parameters.

In some examples of the method, apparatuses, and non-transitory computer-readable medium described herein, the one or more utilities comprises a first utility corresponding to an application security testing stage of the pipeline and the set of metadata parameters comprises vulnerability information associated with the application security testing stage.

In some examples of the method, apparatuses, and non-transitory computer-readable medium described herein, the vulnerability information comprises a quantity of vulnerabilities, seventies respectively corresponding to the vulnerabilities, or both.

In some examples of the method, apparatuses, and non-transitory computer-readable medium described herein, the one or more utilities comprises a set of utilities corresponding to a set of application security testing stages of the pipeline and the vulnerability information comprises a security report associated with a report identifier, the set of utilities, the set of application security testing stages, or any combination thereof.

In some examples of the method, apparatuses, and non-transitory computer-readable medium described herein, the vulnerability information comprises an indication of whether a vulnerability scan associated with the application security testing stage was skipped.

In some examples of the method, apparatuses, and non-transitory computer-readable medium described herein, the pipeline comprises a set of application testing stages comprising at least the application security testing stage and wherein the vulnerability information comprises an indication of skipped vulnerability scans associated with one or more application testing stages of the set of application testing stages.

In some examples of the method, apparatuses, and non-transitory computer-readable medium described herein, the application security testing stage comprises a static application security testing stage, a dynamic application security testing stage, an interactive application security testing stage, runtime application security protection, software composition analysis, or any combination thereof.

In some examples of the method, apparatuses, and non-transitory computer-readable medium described herein, the one or more utilities comprises a second utility corresponding to one or more testing stages of the pipeline and the set of metadata parameters comprises code coverage information associated with the one or more testing stages, the code coverage information comprising a quantity of tests performed, a quantity of tests passed, a quantity of tests skipped, a quantity of tests failed, or any combination thereof.

Some examples of the method, apparatuses, and non-transitory computer-readable medium described herein may further include operations, features, means, or instructions for identifying the immutable identifier as the primary key for generating the metadata.

Some examples of the method, apparatuses, and non-transitory computer-readable medium described herein may further include operations, features, means, or instructions for retrieving the metadata or a subset of the metadata from the database based at least in part on an application command and the immutable identifier.

In some examples of the method, apparatuses, and non-transitory computer-readable medium described herein, the respective stages comprise one or more build stages, one or more testing stages, one or more code quality stages, one or more policy adherence stages, one or more scanning stages, one or more packaging stages, one or more deployment stages, one or more monitoring stages, or any combination thereof.

In some examples of the method, apparatuses, and non-transitory computer-readable medium described herein, the pipeline comprises a continuous integration pipeline, a continuous delivery pipeline, a continuous deployment pipeline, or any combination thereof.

DETAILED DESCRIPTION

Figure 1:
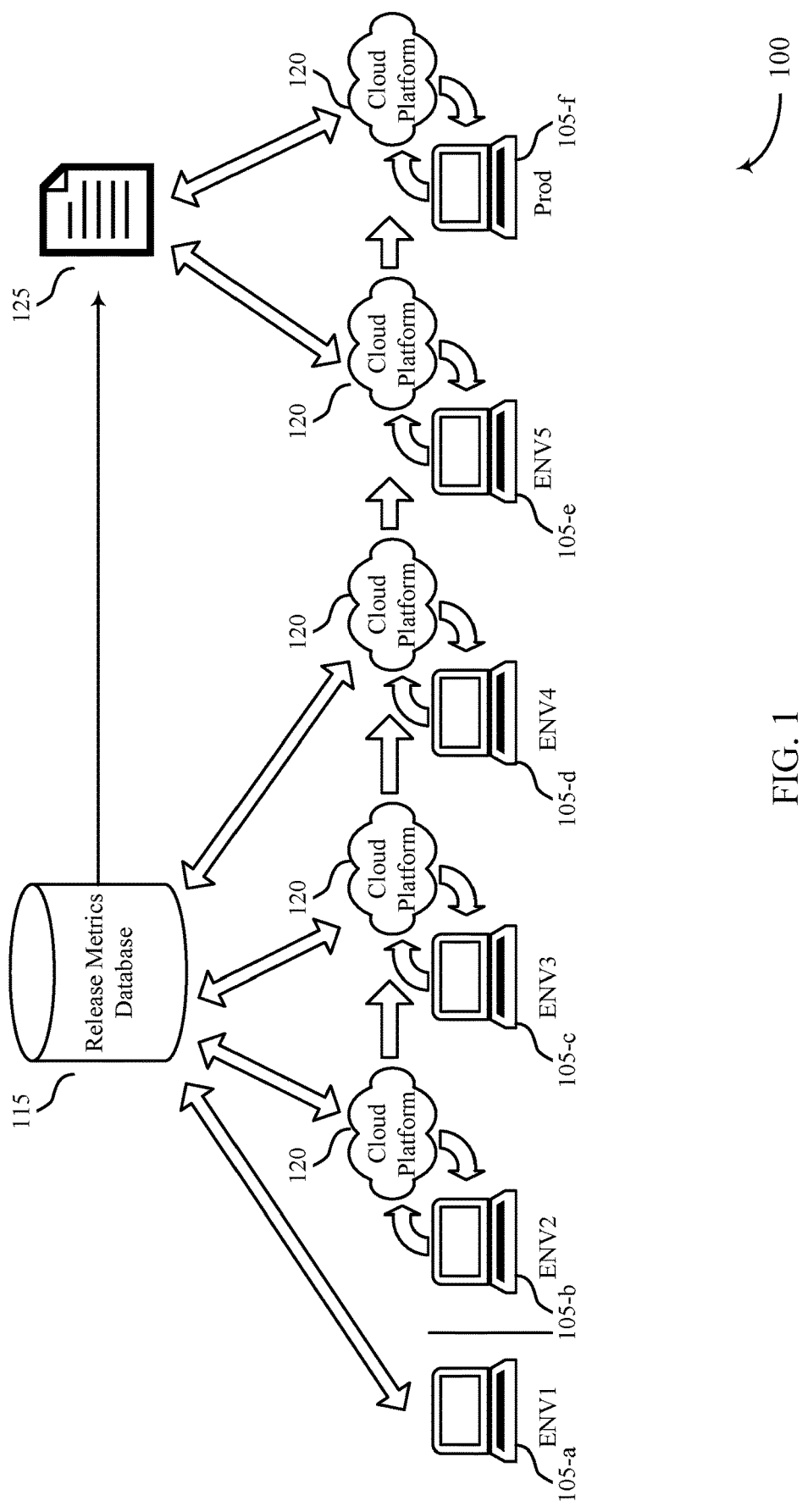
FIG. 1 illustrates an example of a system that supports pipeline release validation in accordance with aspects of the present disclosure.

A DevOps pipeline includes a set of practices implemented by development and operations teams to build, test, and deploy software. Similarly, a DevSecOps pipeline may include additional security (e.g., active and/or automated security audits) for DevOps-based software development. In a software development process, utilizing a DevOps or DevSecOps pipeline may serve to maintain organization during the process. For example, a DevOps or DevSecOps pipeline may utilize strategies such as continuous integration (also referred to herein as CI) for integrating portions or chunks of code from multiple developers into a shared code repository or database as often as possible. Continuous integration may support automatic testing of code for errors, independent of code contributed by other members. Continuous delivery and continuous deployment are extensions of continuous integration. Continuous delivery involves the manual release or deployment of software, features, and code updates (by developers) to production in incremental chunks, whereas continuous deployment involves automation of the release cycle.

A DevOps or DevSecOps pipeline may include various stages, as software may evolve from source code to being deployed in a particular environment. Some of these stages may include application testing stages, unit testing, integration testing, security scanning, software composition analysis, and performance testing, among others. However, different pipeline implementations may leverage different utilities or tools, which may impact traceability for each version of a codebase on which a pipeline is executed. For example, as some DevOps or DevSecOps techniques may utilize pipeline logs for use in debugging, and not as a system of record, such techniques may not retain pipeline logs for any extended period of time. As such, techniques for improving traceability for each version of a deployed codebase may be desired.

According to aspects of the present disclosure, techniques are described for pipeline release validation and release lifecycle management. In some aspects, the techniques may include tracing and auditing metadata for deployments of a codebase. In an example of pipeline release validation, a pipeline may include one or more utilities corresponding to respective stages within the pipeline. A device may execute the pipeline on a version of a codebase, where the version of the codebase is associated with an immutable identifier of a version control management system. The immutable identifier may be, for example, a commit hash. Based on the execution of the pipeline on the version of the codebase, each stage of the pipeline may generate or publish metadata using the immutable identifier as a key (e.g., a primary key)

for referencing the version of the codebase. In an example, each stage of the pipeline may generate or publish metadata for one or more utilities (e.g., application testing tools, application security testing tools) associated with the stage, which may be stored at a database using the immutable identifier as a primary key.

The metadata generated by each stage of the pipeline may be customizable. For example, each stage of the pipeline may generate metadata based on a configured set of metadata parameters. In an example, the metadata parameters may be configured for each stage of the pipeline. In some examples, the metadata parameters may be configured for one or more utilities (e.g., application testing tools, application security testing tools) associated with each stage.

In an example, for an application security testing stage (e.g., a static application security testing (SAST) tool, a dynamic application security testing (DAST) tool) the metadata parameters may include vulnerability information for the application security testing stage. The vulnerability information may include, for example, a quantity of vulnerabilities and respective severities thereof. In another example, for a testing stage, the metadata parameters may include code coverage information associated with the testing stage. The code coverage information may include, for example, a quantity of tests performed, a quantity of tests passed, a quantity of tests skipped, or a quantity of tests failed. Additional examples of pipeline stages and configured metadata parameters are described further herein.

A device may store the metadata at a database, for example, using the immutable identifier as a key (e.g., primary key) for storing the metadata. That is, the immutable identifier may be designated as a primary key for the stored metadata within the database. In some aspects, the device (or another device) may retrieve metadata at one or more gates of the pipeline using the immutable identifier. In an example, a device (e.g., the same device, or another device) may verify metadata at one or more gates of the pipeline based on a comparison of the stored metadata (as retrieved by the device) to policy information associated with the one or more gates.

For example, the device may verify metadata retrieved at a gate of the pipeline based on a comparison of the metadata (as retrieved by the device) to policy information associated with the gate. In another example, the device may verify metadata retrieved at a stage (e.g., an application security testing stage) of the pipeline based on a comparison of the metadata (as retrieved by the device) to policy information associated with the stage. In some other examples, the device may verify metadata retrieved at a utility (e.g., application testing tool, application security testing tool) associated with a stage of the pipeline based on a comparison of the metadata (as retrieved by the device) to policy information associated with the utility.

Aspects of the subject matter described herein may be implemented to realize one or more advantages. The described techniques may support improvements in a software development lifecycle, among other advantages. In some aspects, the features described herein may provide increased accuracy in representing the safety and reliability of a version of a codebase. In some aspects, the techniques described herein with respect to an immutable identifier may provide an external source of verification in the development process.

Aspects of the disclosure are initially described in the context of a system. Examples of processes that support pipeline release validation are then described. Aspects of the disclosure are further illustrated by and described with reference to apparatus diagrams, system diagrams, and flowcharts that relate to pipeline release validation.

FIG. 1 illustrates an example of a system 100 for that supports pipeline release validation in accordance with aspects of the present disclosure. The system 100 may include one or more user devices 105 (e.g., including user device 105-*a* through user device 105-*f*). The system 100 may be, for example, a version control management system. Each user device 105 may be an example of a laptop, a desktop computer, a mobile device, a smart device, or the like.

The system 100 may also include a server (e.g., a database server, an application server, a web server, a cloud server, a server cluster, a virtual machine, a physical server, a machine learning server, etc.) (not shown) and a database 115 (e.g., an application database, a database system, a data store, a data lake, a cloud-based storage system, etc.) (also referred to herein as a release metrics database), or some combination of these and/or other devices. These devices may interact within the system 100, and may implement a process (e.g., a function, algorithm, model, etc.) for one or more applications (e.g., web-based applications, mobile applications, etc.) at the user device 105.

The system 100 may be an example of a database system or a cloud-based system supporting pipeline release validation and may support a number of applications, pages, or both for displaying components. These components may display information, perform defined actions, provide links to other applications (e.g., third-party applications outside of the system), or provide any number of other features as indicated in the component definitions. The applications, pages, and components may be configurable by a user (e.g., an administrative user of an organization, a developer writing code to support backend or frontend processes, etc.).

One or more user devices 105 may transmit and receive data with other user devices 105 or the database 115 via a cloud platform 120. In some aspects, the user devices 105 may communicate over any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), the Internet, etc. In some cases, the user devices 105 may communicate over a wired connection or a wireless connection, or both. For example, the user devices 105 may communication over one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wired or wireless communication systems.

The database 115 may support the storage and retrieval of metadata about a deployment, in which information about the deployment is traceable down to a version of the code. In some examples, the database 115 may use an immutable identifier (e.g., a commit hash) as a primary key for tracing the deployment information. In an example, the immutable identifier may be a git commit hash. In some examples, the database 115 may support data storage and retrieval using a git commit hash as a primary key. In an example, the database 115 may be a database service supportive of key-value and document data structures. In some examples, the database 115 may be any NoSQL database (also referred to herein as a non-SQL database or a non-relational database) providing for storage and retrieval of data.

In some aspects, the database 115 may include an application programming interface (API) Gateway and a serverless compute service for providing an interface (e.g., a bridge) between users and a backend. In some aspects, a user device 105 may retrieve, via the API Gateway and the serverless compute service, all or a portion of metadata associated with some release. In some examples, a user device 105 may retrieve portions of the metadata by commit. The database 115 may support the posting of data for creating new entries and updating metadata for a particular item (e.g., for a particular utility, stage, or gate of the pipeline). In an example, the database 115 may support the overwriting of data posted to the database 115 at each instance additional data is posted. For example, the database 115 may support overwriting of data associated with security scans. In some other examples, the database 115 may support the appending of data to a list. For example, the database 115 may support appending of metadata to a list each time an application is deployed in an environment.

Cloud platform 120 may offer an on-demand database service to the user devices 105. In some cases, cloud platform 120 may be an example of a multi-tenant database system. In this case, cloud platform 120 may serve multiple user devices 105 with a single instance of software. However, other types of systems may be implemented, including—but not limited to—client-server systems, mobile device systems, and mobile network systems. In some cases, cloud platform 120 may support various applications associated with pipeline release validation and release lifecycle management. In some aspects, cloud platform 120 may support applications or other software (e.g., an electronic banking application) related to a financial institution. Cloud platform 120 may receive data from the user devices 105 and may store and analyze the data. In some cases, a user device 105 may develop and deploy applications to run on cloud platform 120. Cloud platform 120 may be implemented using one or more servers. The servers may be local or remote servers. In some cases, the remote servers may be located at one or more data centers.

Each server may include framework in which to run the one or more applications at the user device(s) 105. As an example, the server may be an example of an application server and may implement system software on which the applications may run. More generally, the server may provide a software framework for creating and running applications. As such, the server may support administrative functions for creating, modifying, or otherwise managing various applications. For example, an administrative user or software developer may create and customize an application using various software or components of the server (e.g., an application builder, an API, or other application tools). The server may support building applications or pages that can be rendered on a number of different user interface types at the user devices 105 (e.g., including different types and versions of user devices 105). In some cases, the server may perform data processing, and the server may be an example of a cloud device or may be located at a data center. The server may support serving dynamic content and transferring applications or application data from one user device 105 to another. In some cases, the server may further provide for hosting applications and processes using various protocols.

In some cases, the server may be part of a client-server system, a mobile device system, an electronic banking system, a mobile network system, or the like. In some cases, the server may support pipeline release validation solutions. This may include support for a software delivery DevOps pipeline and traceability for deployed versions of a codebase. The server may receive data associated with an application over a network connection, and may store and analyze the data. For instance, the server may communicate with database 115, which may be used to store information associated with various users, accounts, clients, and other information. In some cases, the server may receive data directly from an interaction between a user device 105 and the server. In some examples, the server may be implemented using one or more remote servers. In some cases, the remote servers may be located at one or more data centers.

In some examples, the server may be an example of a database server, which may comprise a database application using a particular architecture (e.g., a client/server architecture). The server and the database 115 may include hardware or software components supporting data processing for the system 100. The server and the database 115 may accordingly include a processing component and a local data storage component, where the local data storage component supports the memory resources of the server and/or database 115, and may be an example of a magnetic tape, magnetic disk, optical disc, flash memory, main memory (e.g., random-access memory (RAM)), memory cache, cloud storage system, or a combination thereof. The server may perform various functions on data sets at the database 115, which may include storing metadata to the database 115 or retrieving metadata from the database 115 using an immutable identifier (e.g., a commit hash). In some cases, the database 115 may be an example of release metrics database, or some combination with other types of databases. The functions performed by the system 100 may be based on a user input command (e.g., via an application) or may be automatic based on a configuration of the system 100.

According to examples of aspects described herein, techniques are described for pipeline release validation and release lifecycle management, for example, of a continuous integration pipeline (e.g., where code changes may be merged with a central repository), continuous delivery pipeline (e.g., where code changes may be deployed within some environment prior to deployment), and/or a continuous deployment pipeline (e.g., where code changes may be deployed to a production environment). The techniques described herein may include tracing and auditing metadata for deployments of a codebase.

In an example, the user device 105-a may be local to the database 115 (e.g., communicate with the database 115 over a LAN), and one or more additional user devices 105 (e.g., the user device 105-b through user device 105-f) may communicate with the database 115 via the cloud platform 120. In some aspects, any of the user devices 105-a through 105-f may be associated with one or more product development environments. For example, user device 105-a may be associated with an environment ENV1, which may be an example of a local development environment. User device 105-b may be associated with an environment ENV2, which may be an example of a development environment, and user device 105-c may be associated with an environment ENV3 (e.g., a quality assurance environment). In some aspects, user device 105-d may be associated with an environment ENV4 that may be an example of a collaborative-adversarial pair (CAP) programming environment, and user device 105-e may be associated with an environment ENV5 that is an example of a personal software process (PSP). Additionally or alternatively, a user device 105 (e.g., user device 105-f) may be associated with a production stage or some other environment(s).

Any of the user devices 105-a through 105-f may correspond to a user device 105 associated with a development process. For example, any of the user devices 105-*a* through 105-*f* may transmit compliance results to the database 115 based on build and post-deployment results. In another example, any of the user devices 105-*a* through 105-*f* may support building, testing, scanning, packaging, deployment, and monitoring of a codebase. In some examples, any of the user devices 105 (e.g., user device 105-*a* through user device 105-*f*) may be configured to perform functions for storing metadata at the database 115.

In an example, any of the user devices 105 (e.g., user devices 105-*a* through 105-*f*) may store metadata (e.g., compliance results) at the database 115 using an immutable identifier (e.g., a commit hash, git commit hash, or the like). The immutable identifier may be designated as a key (e.g., primary key) for accessing the stored metadata. The immutable identifier described herein, however, is not limited a commit hash. For example, the immutable identifier may include any unchangeable identifier associated with a content change tracking architecture. In some aspects, any of the user devices 105 (e.g., user devices 105-*a* through 105-*f*) may generate, retrieve, and verify metadata at one or more gates of the pipeline using an immutable identifier. In some other aspects, the same user device 105 (e.g., any of user device 105-*a* through user device 105-*f*) may generate, retrieve, and verify metadata at one or more gates of the pipeline using an immutable identifier.

In an example of pipeline release validation, a user device 105 (e.g., user device 105-*a*, user device 105-*b*) may execute the pipeline on a version of a codebase, where the version of the codebase is associated with an immutable identifier identified by the user device 105 as the key (e.g., primary key) for generating metadata associated with the pipeline. In an example, based on the execution of the pipeline on the version of the codebase, the user device 105 may generate or publish metadata using the immutable identifier. The metadata may include, for example, compliance results. The user device 105 may store the metadata to the database 115 using the immutable identifier.

In an example, using the immutable identifier, the user device 105 (e.g., user device 105-*a*, user device 105-*b*) may generate or publish metadata for one or more stages (e.g., a build stage, an application testing stage, an application security testing stage, a code quality stage, a policy adherence stage, a scanning stage, a packaging stage, a deployment stage, a monitoring stage) of the pipeline. In some examples, for a stage of a pipeline, the user device 105 may generate or publish metadata for one or more utilities (e.g., application testing tools, application security testing tools) associated with the stage. The metadata may include, for example, compliance results associated with any of the stages of the pipeline. In some aspects, the metadata may include compliance results for one or more utilities for any of the stages of the pipeline. An example pipeline and example stages thereof are described with reference to FIG. 2.

In some examples, a user device 105 (e.g., user device 105-*e*) may verify metadata at one or more gates (also referred to herein as release gates) of the pipeline. In some aspects, the gates may be enabled at the start of a stage (e.g., pre-deployment conditions) or at the end of a stage (e.g., post-deployment conditions), or both. Pre-deployment gates, for example, may be enabled to ensure that no active issues are present prior to deploying a build to an environment. Post-deployment gates, for example, may be enabled to ensure that no incidents occur after deployment, prior to promoting release of the build to the next environment. In some aspects, the system 100 may support automated gating based on utilities (e.g., SAST Scanning, Code Quality, Unit Tests) associated with each stage of the pipeline.

For example, the user device 105 (e.g., user device 105-*e*) may retrieve metadata at a gate (or gates) of the pipeline and compare the retrieved metadata to policy information 125 associated with the gate (or gates). In an example, for metadata retrieved by the user device 105 at a gate of the pipeline, the user device 105 may verify the retrieved metadata based on the comparison of the metadata to policy information 125 associated with the same gate (or gates). In some aspects, the metadata may include compliance results for stages (and utilities associated with the stages) in the pipeline which precede the gate.

The user device 105 (e.g., user device 105-*e*) may retrieve the metadata from the database 115 based on an application command and the immutable identifier as the key (e.g., primary key) for referencing the version of the codebase. In some aspects, the metadata retrieved by the user device 105 may be customizable. For example, the user device 105 may retrieve metadata for one or more stages (e.g., a build stage, an application testing stage) of the pipeline based on configured metadata parameters for the one or more stages. In some examples, based on configured metadata parameters, the user device 105 may retrieve metadata for one or more utilities (e.g., application testing tools, application testing tools) for any stage of the pipeline. Examples of configured metadata parameters and utilities associated with stages of the pipeline are described further herein with reference to FIG. 2.

The user device 105 (e.g., user device 105-*e*) may verify the retrieved metadata based on a comparison to policy information 125 respectively associated with one or more gates, stages, or utilities. Accordingly, the metadata may be implemented for verifying compliance of a deployment with the policy information 125. The policy information 125 may include, for example, enterprise policies or enterprise standards stored as policy files (e.g., YAML Ain't Markup Language (YAML)-based, JavaScript object notation (JSON)-based). As described herein, enterprise policies or enterprise standards included in the policy information 125 may be implemented as code, and the system 100 may support deployment of a codebase to production in which the deployment aligns with any and all of the enterprise policies or enterprise standards. In some cases, the policy information 125 may include one or policies (e.g., security policies, data management policies, or the like) designated or implemented by an enterprise. As an example, a financial institution may have one or more policies related to an application or other software (e.g., an electronic banking application), and the policy information 125 may include various aspects of such policies. Accordingly, by comparing the metadata to the policy information 125, a user may determine whether a version of a codebase satisfies one or more policies (e.g., at respective gates), thereby enhancing the development process and enabling procedural efficiencies.

Accordingly, in some aspects, the user device 105 (e.g., user device 105-*e*) may serve as a final stage in the pipeline before going to the codebase goes to production, for example, at another user device 105 (e.g., user device 105-*f*). That is, the user device 105 may query an immutable identifier (e.g., commit hash) being deployed, and the user device 105 may receive metadata corresponding to the query, where the metadata includes security, testing, and other information. In some examples, if the user device 105 detects a failed policy based on the comparison of retrieved metadata to the policy information 125, the user device 105 may terminate or pause deployment of the codebase until all policies or standards included in the policy information 125 have been met. The techniques described herein for terminating or pausing deployment of the codebase may thereby reduce risk and provide development teams a relatively safe and quick pathway to production. Accordingly, the described techniques may provide advantages over some DevOps and DevSecOps techniques, for example, which may include shifting security gates and unit testing left (e.g., to an earlier stage) along the pipeline.

In an example, the user device 105 (e.g., user device 105-e) may transmit the comparison results (e.g., compliance results) to another user device 105. Additionally, or alternatively, the user device 105 may store the comparison results, and a service center may retrieve the comparison results from the user device 105 and provide the comparison results to the other user device 105. In some aspects, the comparison results may include audit information associated with one or more gates, stages, or utilities of the pipeline (e.g., per the configured metadata parameters). In some examples, the other user device 105 (or the service center) may automatically open and close the comparison results with all audit information.

In some examples, at any moment in time, the user device 105 (e.g., user device 105-e) may retrieve a version of a codebase by immutable identifier (e.g., commit, git commit). The user device 105 may determine or verify whether the version of the codebase was scanned, whether any vulnerabilities were found, whether all tests were passed by each team (e.g., development team, quality assurance team), and so on. In some aspects, such data may be indicated as a release dashboard (e.g., via a graphical user interface) displayed at the user device 105 and may be implemented as a manual gate before a team goes to production.

In some aspects, a user device 105 (e.g., any of user devices 105-a through 105-f) may support a release dashboard which may provide traceability of the health of deployed applications, for example, traceable down to a commit level. Example aspects of the release dashboard may provide an interface via which change owners may make an informed decision of whether to move forward with a deployment. In some examples, the release dashboard may indicate to a change owner any critical vulnerabilities. In some cases, the release dashboard may provide an interface via which the change owner may open or provide security exceptions with respect to the vulnerabilities (e.g., to proceed to production). Accordingly, the techniques may provide advantages for change owners. For example, gates may occur in a development environment, and the techniques described herein may provide change owners an awareness of those gates at the time of pre-production or production deployments.

An example of a data structure for the database 115 is described below with reference to pipeline release validation. In particular, the below data structure may be an example of metadata associated with an immutable identifier that is stored in the database 115.

| Name | Value |
|---|---|
| commitID | c6ff5558ff0a0856b791712973c8d32cfbdb9268 |
| policyCheck | [Record] |
| imageScan | [Record] |
| dependencyScan | [Record] |

-continued

| Name | Value |
|---|---|
| qualityScan | [Record] |
| deployments | [List] |

Referring to the example data structure and example aspects described herein, the user device 105 (e.g., user device 105-e) may retrieve metadata using an immutable identifier (e.g., commitID). In some aspects, the immutable identifier may include a Git commit ID. In other examples, the immutable identifier may include a commit ID for other version control systems (e.g., different from Git). In some examples, the metadata may include values or records associated with any number of policy checks, image scans, dependency scans, quality scans, and deployments associated with a version of a codebase. It is noted that other information, fields, parameters, or aspects of the metadata may be possible, and the examples provided herein should not be considered limiting. For example, the metadata may include any number of fields or information related to a release of a codebase and used for pipeline release validation, and the examples described herein are some examples that may be used.

It should be appreciated by a person skilled in the art that one or more aspects of the disclosure may be implemented in the system 100 to provide improvements to the software development lifecycle, as well as problems other than those described herein. Further, aspects of the disclosure may provide technical improvements to "conventional" systems or processes as described herein.

Figure 2:
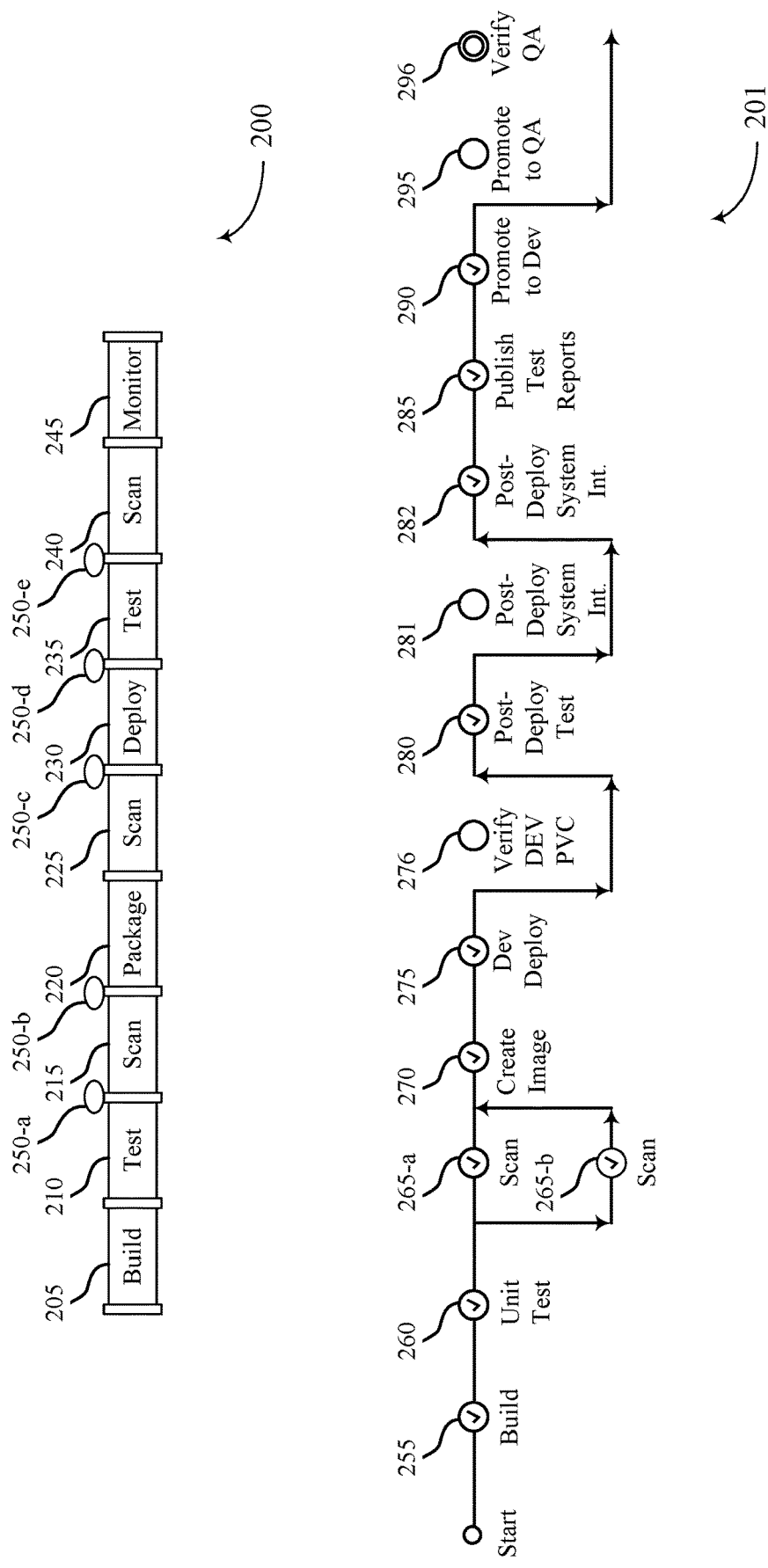
FIG. 2 illustrates examples of pipelines that support pipeline release validation in accordance with aspects of the present disclosure.

FIG. 2 illustrates example pipelines 200 and 201 that support pipeline release validation in accordance with aspects of the present disclosure. In some aspects, pipelines 200 and 201 may each correspond to a DevOps or DevSecOps pipeline as described herein. Pipelines 200 and 201 may be implemented by aspects of the system 100 described with reference to FIG. 1.

According to the example illustrated in FIG. 2, pipeline 200 may include a build stage 205 (also referred to herein as a coding stage), a testing stage 210, a scanning stage 215, a packaging stage 220, a scanning stage 225, a deployment stage 230, a testing stage 235, a scanning stage 240, and a monitoring stage 245. In some examples, the testing stage 210 through the testing stage 235 may utilize automation servers such as, for example, Jenkins. In some aspects, the pipeline 200 may include one or more utilities corresponding to respective stages within the pipeline 200.

The build stage 205 may support building or compiling of an application. In some cases, the build stage 205 may support utilities for building, testing, storing, and managing code and build configurations, for example, using any language (e.g., Java, JavaScript, PHP, Ruby, Python) or platform. For example, the build stage 205 may utilize utilities for repository management, which may, for example, be associated with a Git-based source code repository hosting service.

The testing stage 210 may support code testing of the application. In some examples, the testing stage 210 may support pre-deployment testing. In some cases, the testing stage 210 may support utilities for facilitating continuous integration, continuous delivery, and continuous deployment related to build, test, and deployment. In some cases, the testing stage 210 may utilize test libraries such as JUnit, QUnit, Jasmine, or other unit testing frameworks. In some examples, the testing stage 210 may be an application testing stage. In some other examples, the testing stage 210 may be an application security testing stage.

The scanning stage 215 may support continuous inspection of code quality, policy adherence for infrastructure or configuration, or a combination thereof. In some cases, the scanning stage 215 may utilize platforms to perform automatic reviews with static analysis of code to detect bugs, code smells, and security vulnerabilities. In some examples, the scanning stage 215 may utilize platforms supportive of continuous inspection of code quality and security of codebases. Some other platforms may include software composition analysis solutions for detecting and identifying open source components. In some cases, the scanning stage 215 may utilize platforms supportive of identifying and reporting of patterns found in code, improving code consistency, and bug identification or mitigation. In some other cases, the platforms may support the defining of rules, actions, and policies for satisfying parameters defined by an organization or development teams. In some cases, the scanning stage 215 may provide reports on duplicated code, coding standards, unit tests, code coverage, code complexity, comments, bugs, and security vulnerabilities.

The packaging stage 220 may support build automation for the application. In some cases, the packaging stage 220 may support utilities for building and managing of projects. In some aspects, the packaging stage 220 may utilize utilities for publishing and retrieving versioned apps and their dependencies by using central repositories accessible from other environments. Some example utilities include build automation tools.

The scanning stage 225 may support utilities for vulnerability analysis associated with various stages (e.g., any of build stage 205, testing stage 210, scanning stage 215, or packaging stage 220) of an application lifecycle. In some examples, the scanning stage 240 may support identifying, resolving, and prevention of security vulnerabilities associated with the various stages. In some examples, the scanning stage 240 may support utilities for cloud-based detection of vulnerabilities on networked assets (e.g., servers, network devices, workstations.

The deployment stage 230 may support deployment of a final version of a build, for example, once a production environment has been created and configured. In some cases, the deployment stage 230 may support utilities such as cloud development platforms supportive of application development and deployment on cloud infrastructures, secure cloud services platforms, or cloud computing virtualization platforms.

The testing stage 235 may support code testing of the application, for example for test applications, measuring system behavior and performance under load. In some examples, the testing stage 235 may support post-deployment testing. In some cases, the testing stage 235 may support utilities for visual testing of a deployed application. For example, the testing stage 235 may support various coding styles (e.g., in which portions of expressions are reversed in a conditional statement). In some cases, the testing stage 235 may support utilities for identifying visual bugs in an application (e.g., overlapping, invisible, or off-page visual elements). In some aspects, the testing stage 235 may support quality assurance test management applications for managing release and test cycles, planning and assignment of test tasks, execution of test coverage, and product defect submission. In some other aspects, the testing stage 235 may support load testing tools. In some examples, the testing stage 235 may be an application testing stage. In some other examples, the testing stage 235 may be an application security testing stage.

The scanning stage 240 may support utilities for vulnerability analysis associated with various stages (e.g., any of build stage 205, testing stage 210, scanning stage 215, packaging stage 220, scanning stage 225, deployment stage 230, or testing stage 235) of an application lifecycle. In some examples, the scanning stage 240 may support identifying, resolving, and prevention of security vulnerabilities associated with the various stages. In some cases, the scanning stage 240 may support utilities such as application security platforms for providing security observability across a software development life cycle. In some cases, the scanning stage 240 may support utilities such as vulnerability management platforms. In some examples, the scanning stage 240 may support utilities for cloud-based detection of vulnerabilities on networked assets (e.g., servers, network devices, workstations. In some other examples, the scanning stage 240 may support utilities for cloud collection of data across an environment.

The monitoring stage 245 may support visualization of near real-time status of the pipeline 200. In some cases, the monitoring stage 245 may support capturing, indexing, and correlation of real-time data in a searchable repository, from which graphs, reports, alerts, dashboards and visualizations may be generated by a user device 105. For example, the monitoring stage 245 may support tracking of code check-ins, builds, test passes, and deployments in real-time. In some cases, the monitoring stage 245 may support utilities such as application performance management tools, security information and event management (SIEM) solutions, or tools for end-to-end monitoring of a DevOps pipeline.

In some examples, gates 250 (e.g., gate 250-a through gate 250-e) (also referred to herein as release gates) may be enabled within the pipeline 200. In some aspects, the gates 250 may include any combination of pre-deployment gates or post-deployment gates as described herein. In an example, gate 250-a may be employed between the testing stage 210 and the scanning stage 215, gate 250-b may be employed between the scanning stage 215 and the packaging stage 220, gate 250-c may be employed between the scanning stage 225 and the deployment stage 230, gate 250-d may be employed between the deployment stage 230 and the testing stage 235, and gate 250-e may be employed between the testing stage 235 and the scanning stage 240.

It should be noted that the pipeline 200 is not limited to the stages, utilities, and gates described herein, and any combination of stages, utilities, and gates as described herein may be implemented in the pipeline 200. For example, the pipeline 200 may include test phases (e.g., integration tests) in addition to, or in place of, one or more test phases described herein. In some examples, the pipeline 200 may include stages (e.g., load testing, deployment verification, etc.) in addition to or in place of one or more stages described herein. Further, the utilities described herein are examples, and aspects of the system 100 of FIG. 1, the pipeline 200, and the pipeline 201 are not limited thereto.

With reference to FIGS. 1 and 2, using an immutable identifier (e.g., commit hash) as a primary key, a user device 105 (e.g., user device 105-a, user device 105-b) may generate or publish metadata for one or more stages (e.g., build stage 205, testing stage 210, scanning stage 215, packaging stage 220, scanning stage 225, deployment stage 230, testing stage 235, scanning stage 240, monitoring stage 245) of the pipeline 200. In some examples, for a stage of a pipeline 200, the user device 105 (e.g., user device 105-a, user device 105-b) may generate or publish metadata for one or more utilities (e.g., application testing tools, application security testing tools) associated with the stage.

In an example, the user device 105 (e.g., user device 105-a, user device 105-b) may generate metadata for the build stage 205. The metadata may include, for example, compliance results associated with the build stage 205. In some examples, the user device 105 (e.g., user device 105-a, user device 105-b) may generate metadata for a utility for repository management associated with the build stage 205. In some aspects, the metadata may include compliance results associated with the utility.

In another example, a user device 105 (e.g., user device 105-c described with reference to FIG. 1) may generate metadata for the testing stage 210. The metadata may include, for example, compliance results associated with the testing stage 210. In some examples, the user device 105 may generate metadata for a utility for pre-deployment testing (e.g., Jenkins) or a test library (e.g., JUnit) associated with the testing stage 210. In some aspects, the metadata may include compliance results associated with the utility.

In some aspects, a user device 105 (e.g., user device 105-e described with reference to FIG. 1) may retrieve metadata at one or more of the gates 250 (e.g., gate 250-a through gate 250-e) (also referred to herein as release gates) of the pipeline 200 based on an application command and the immutable identifier as the key (e.g., primary key) for referencing the version of the codebase. In some aspects, the metadata retrieved by the user device 105 may be customizable. For example, the user device 105 may retrieve metadata for one or more stages of the pipeline 200 based on configured metadata parameters for the one or more stages. In some examples, based on configured metadata parameters, the user device 105 may retrieve metadata for one or more utilities (e.g., application testing tools, application testing tools) for any stage of the pipeline 200.

In an example, the user device 105 (e.g., user device 105-e described with reference to FIG. 1) may retrieve and verify metadata at one or more of the gates 250 (e.g., gate 250-a through gate 250-e) (also referred to herein as release gates) of the pipeline 200. For example, the user device 105-e may retrieve metadata at the gate 250-a of the pipeline 200 and compare the retrieved metadata to policy information (e.g., policy information 125 described with reference to FIG. 1) associated with the gate 250-a. In some aspects, the metadata may include compliance results for one or more stages preceding the gate 250-a. For example, the metadata may include compliance results for the build stage 205 (and utilities associated with the build stage 205, such as utilities for repository management), the testing stage 210 (and utilities associated with the testing stage 210, such as Jenkins or JUnit), or both.

In some examples, the user device 105 (e.g., user device 105-e described with reference to FIG. 1) may retrieve metadata at the gate 250-b of the pipeline 200 and compare the retrieved metadata to policy information (e.g., policy information 125 described with reference to FIG. 1) associated with the gate 250-b. In some aspects, the metadata may include compliance results for one or more stages preceding the gate 250-b. For example, the metadata may include compliance results for the build stage 205 (and utilities associated with the build stage 205, such as utilities for repository management), the testing stage 210 (and utilities associated with the testing stage 210, such as Jenkins or JUnit), the scanning stage 215 (and utilities associated with the scanning stage 215, such as platforms supportive of continuous inspection of code quality and security of codebases), or a combination thereof.

In another example, the user device 105 (e.g., the user device 105-e) may retrieve metadata at the gate 250-e of the pipeline 200 and compare the retrieved metadata to policy information (e.g., policy information 125 described with reference to FIG. 1) associated with the gate 250-e. In some aspects, the metadata may include compliance results for one or more stages preceding the gate 250-e. For example, the metadata may include compliance results for the build stage 205 (and utilities associated with the build stage 205, such as utilities for repository management), the testing stage 210 (and utilities associated with the testing stage 210, such as Jenkins or JUnit), the scanning stage 215 (and utilities associated with the scanning stage 215, such as platforms supportive of continuous inspection of code quality and security of codebases), the packaging stage 220 (and utilities associated with the packaging stage), the scanning stage 225 (and utilities associated with the scanning stage 225, such as cloud-based detection of vulnerabilities), the deployment stage 230 (and utilities associated with the deployment stage 230, such as cloud development platforms), the testing stage 235 (and utilities associated with the testing stage 235), or a combination thereof.

In some aspects, for an application security testing stage (e.g., the testing stage 210, the testing stage 235), the metadata parameters may include vulnerability information for the application security testing stage. The vulnerability information may include, for example, a quantity of vulnerabilities and respective severities thereof. In some aspects, the vulnerability information may include a security report associated with a report identifier and one or more utilities associated with the application security testing stage. In an example, the user device 105 may track a report identifier to retrieve, from the database 115, an entire security report for all stages, utilities, and gates in the pipeline 200. In some examples, the user device 105 may track a report identifier to retrieve, from the database 115, a portion of the security report (e.g., for a subset of stages, utilities, or gates in the pipeline 200).

The application security testing stage may include an SAST stage. In some aspects, the application security testing stage may include a DAST stage. In some other aspects, the application security testing stage may include an interactive application security testing (IAST) stage. In some examples, the application security testing stage may include runtime application security protection (RASP). In some other examples, the application security testing stage may include software composition analysis (SCA). In an example, a user device 105 (e.g., user device 105-e described with reference to FIG. 1) may indicate, via a dashboard, "SAST Scanning Vulnerabilities. Critical: 1. High: 2. Low: 27." In another example, the user device 105 may indicate, via the dashboard, "DAST Scanning Vulnerabilities. Critical: 0. High: 2. Low: 27."

In another example, for an application security testing stage (e.g., the testing stage 210, the testing stage 235), the metadata parameters may include code coverage information associated with the application security testing stage. The code coverage information may include, for example, a quantity of tests performed, a quantity of tests passed, a quantity of tests skipped, or a quantity of tests failed. In an example, a user device 105 (e.g., user device 105-e) may indicate, via a dashboard, "Code Quality: A. Code Coverage: 87%." In another example, the user device 105 may indicate, via the dashboard, "Unit Tests Ran: 1204. Unit Tests Passed: 1204. Unit Tests Skipped: 1. Unit Tests Failed: 0."

In some aspects, the code coverage information may include, for example, functional testing of an application tested at the application security testing stage. For instance, the code coverage information may include verification testing of functional aspects (e.g., functionalities) of the application. In some cases, functional testing may include any combination of unit testing (e.g., testing each component or module of an application or a software project) integration testing (e.g., testing the integration of combined components or modules), end-to-end testing (e.g., functional testing of an entire application or entire software system), smoke testing, sanity testing, regression testing (e.g., testing system functionality in view of changes in any component, module, or function), acceptance testing (e.g., at a client side), white box testing (e.g., testing internal structures or workings of an application), black box testing (e.g., testing functionality of an application by a quality assurance team), interface testing, or the like.

In some other aspects, the code coverage information may include, for example, non-functional testing of an application tested at the application security testing stage. For instance, the code coverage information may include verification testing of non-functional aspects (e.g., performance, reliability, usability, security) of the application. In some cases, functional testing may include any combination of performance testing, security testing, load testing, failover testing, compatibility testing, usability testing, scalability testing (e.g., testing based on number of users, amount of data, number of transactions), volume testing, stress testing, maintainability testing, compliance testing, efficiency testing, reliability testing, endurance testing, disaster recovery testing, localization testing, internationalization testing, and the like.

In some examples, the user device 105 may indicate, via the dashboard, whether a vulnerability scan associated with the application security testing stage was skipped. In some other examples, the user device 105 may provide, via the dashboard, an indication of skipped vulnerability scans associated with one or more application testing stages. For example, the user device 105 may indicate, via the dashboard, "Open Source Vulnerability Scanning. SKIPPED."

In some examples, the user device 105 may indicate, via the dashboard, version information of a codebase on which the pipeline is executed. For example, the user device 105 may indicate whether a version of codebase on which the pipeline is executed is current. For example, the dashboard may indicate, "Is base image current? Yes."

The example aspects described herein may provide advantages in a DevOps pipeline for improving accuracy in representing the safety and reliability of a version of a codebase. For example, in some development processes, developers may have the ability to bypass gates. The techniques described herein with respect to an immutable identifier may provide an external source of truth in the development process.

According to the example illustrated in FIG. 2, the pipeline 201 may include a build stage 255 (also referred to herein as a coding stage), a unit testing stage 260, a scanning stage 265-a (e.g., a scan using a utility such as a software composition analysis tool), a scanning stage 265-b (e.g., a scan using a utility such as a platform supportive of continuous inspection of code quality and security of codebases), an image creation stage 270, a developer deployment stage 275, a developer persistent volume claim (PVC) verification stage 276, a post-deployment testing stage 280, a post-deployment system integration stage 281, a post-deployment system integration stage 282, a test report publication stage 285, a promote to developer stage 290, a promote to QA stage 295, and a QA verification stage 296. The pipeline 201 may include examples of aspects of the system 100 and the pipeline 200 described herein with reference to FIGS. 1 and 2. Referring to the example pipeline 201, one or more stages may have been skipped. For example, the developer PVC verification stage 276, the post-deployment system integration stage 281, the promote to QA stage 295, and the QA verification stage 296 may have been skipped.

According to examples of aspects described herein, a user device 105 (e.g., user device 105-e) may retrieve a version of a codebase by immutable identifier (e.g., commit, git commit) and determine or verify whether the version of the codebase was scanned, whether any vulnerabilities were found, whether all tests were passed by each team (e.g., development team, quality assurance team), and so on. For example, referring to the example pipeline 201, based on metadata retrieved by the user device 105 using the immutable identifier, the user device 105 may determine that the build stage 255, the unit testing stage 260, the scanning stage 265-a, the scanning stage 265-b, the image creation stage 270, the developer deployment stage 275, the post-deployment testing stage 280, the post-deployment system integration stage 282, the test report publication stage 285, and the promote to developer stage 290 have been performed. In some aspects, the user device 105 may determine that the developer PVC verification stage 276, the post-deployment system integration stage 281, the promote to QA stage 295, and the QA verification stage 296 have been skipped or not performed.

It should be noted that the examples of generating and verifying metadata are not limited to the stages, utilities, and gates described herein. The techniques described herein may support the generation and verification of metadata for any combination of stages, utilities, and gates as described herein with reference to the example pipelines 200 and 201. For example, the techniques described herein may support a larger or smaller number of stages, utilities, or gates as described herein with reference to the example pipelines 200 and 201. As such, the example pipelines 200 and 201 described herein should not be considered limiting, and the example pipelines 200 and 201 are some examples of the systems that may use the techniques described herein.

Figure 3:
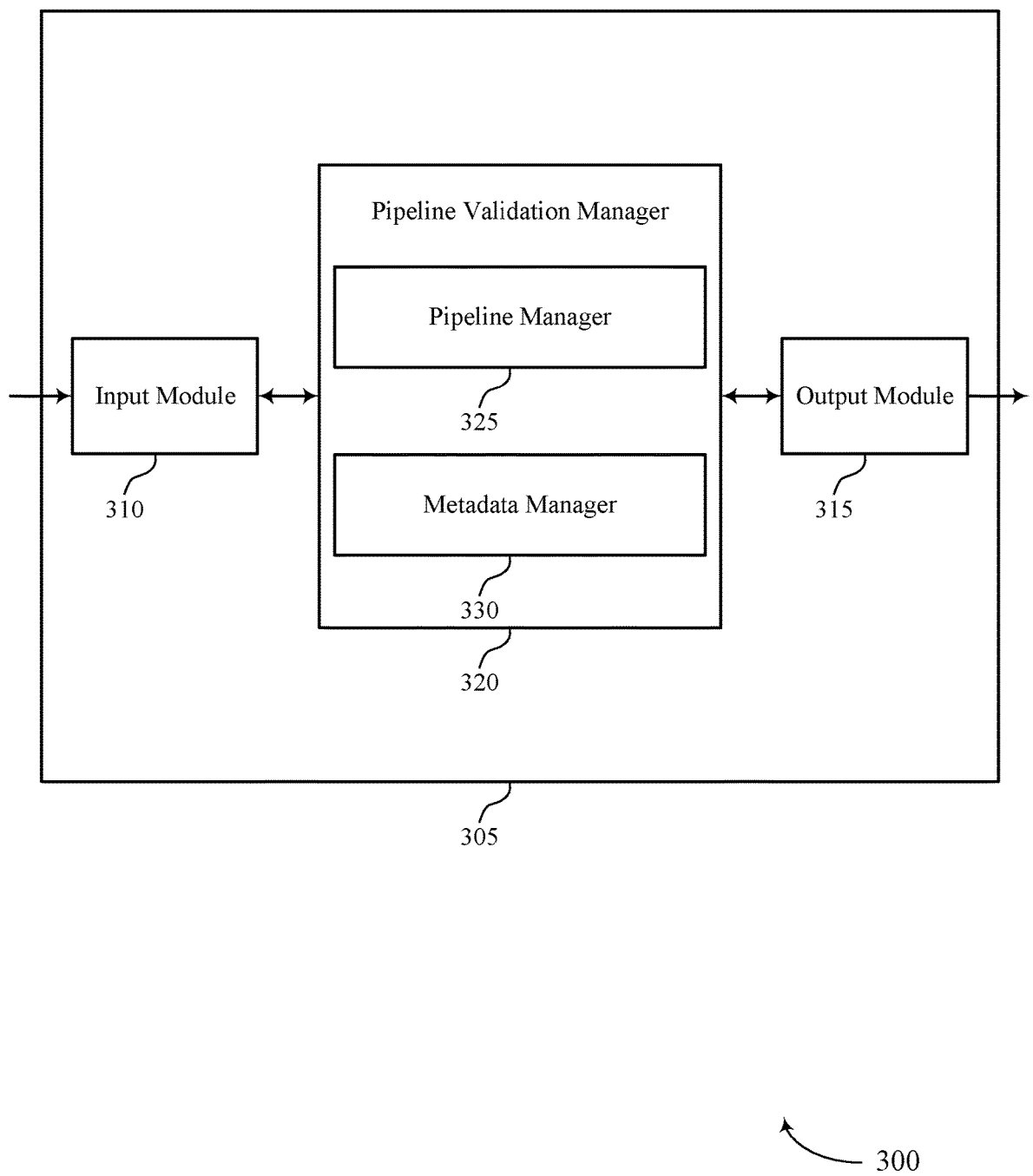
FIG. 3 shows a block diagram of an apparatus that supports pipeline release validation in accordance with aspects of the present disclosure.

FIG. 3 shows a block diagram 300 of a device 305 that supports pipeline release validation in accordance with aspects of the present disclosure. The device 305 may include an input module 310, an output module 315, and a pipeline validation manager 320. The device 305 may also include a processor. Each of these components may be in communication with one another (e.g., via one or more buses).

The input module 310 may manage input signals for the device 305. For example, the input module 310 may identify input signals based on an interaction with a modem, a keyboard, a mouse, a touchscreen, or a similar device. These input signals may be associated with user input or processing at other components or devices. In some cases, the input module 310 may utilize an operating system such as iOS®, ANDROID®, MS-DOS®, MS-WINDOWS®, OS/2®, UNIX®, LINUX®, or another known operating system to handle input signals. The input module 310 may send aspects of these input signals to other components of the device 305 for processing. For example, the input module 310 may transmit input signals to the device 505 to support pipeline release validation. In some cases, the input module 310 may be a component of an I/O controller 510 as described with reference to FIG. 5.

The output module 315 may manage output signals for the device 305. For example, the output module 315 may receive signals from other components of the device 305, such as the pipeline validation manager 320, and may transmit these signals to other components or devices. In some specific examples, the output module 315 may transmit output signals for display in a user interface, for storage in a database or data store, for further processing at a server or server cluster, or for any other processes at any number of devices or systems. In some cases, the output module 315 may be a component of an I/O controller 510 as described with reference to FIG. 5.

For example, the pipeline validation manager 320 may include a pipeline manager 325 a metadata manager 330, or any combination thereof. In some examples, the pipeline validation manager 320, or various components thereof, may be configured to perform various operations (e.g., receiving, monitoring, transmitting) using or otherwise in cooperation with the input module 310, the output module 315, or both. For example, the pipeline validation manager 320 may receive information from the input module 310, send information to the output module 315, or be integrated in combination with the input module 310, the output module 315, or both to receive information, transmit information, or perform various other operations as described herein.

The pipeline validation manager 320 may support managing metadata in accordance with examples as disclosed herein. The pipeline manager 325 may be configured as or otherwise support a means for executing a pipeline on a version of a codebase, the pipeline comprising one or more utilities corresponding to respective stages within the pipeline, wherein the version of the codebase is associated with an immutable identifier of a version control management system. The metadata manager 330 may be configured as or otherwise support a means for generating metadata for at least one utility of the one or more utilities of the pipeline based at least in part on executing the pipeline on the version of the codebase. The metadata manager 330 may be configured as or otherwise support a means for storing the metadata at a database, wherein the immutable identifier is designated as a primary key for the stored metadata. The metadata manager 330 may be configured as or otherwise support a means for verifying the metadata at one or more gates of the pipeline based at least in part on a comparison of the stored metadata to a set of policy information associated with the one or more gates.

Figure 4:
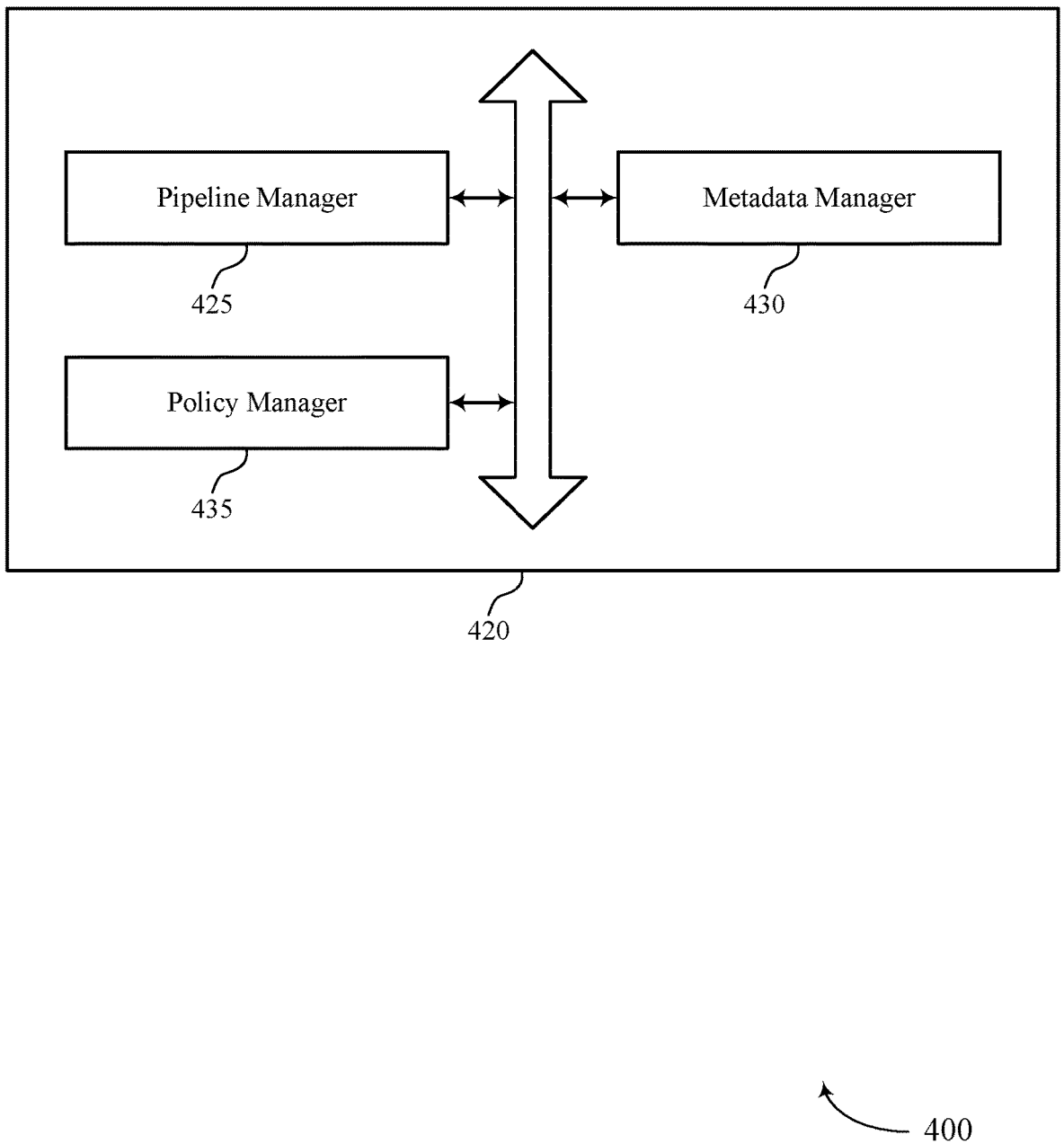
FIG. 4 shows a block diagram of a pipeline validation manager that supports pipeline release validation in accordance with aspects of the present disclosure.

FIG. 4 shows a block diagram 400 of a pipeline validation manager 420 that supports pipeline release validation in accordance with aspects of the present disclosure. The pipeline validation manager 420 may be an example of aspects of a pipeline validation manager or a pipeline validation manager 320, or both, as described herein. The pipeline validation manager 420, or various components thereof, may be an example of means for performing various aspects of pipeline release validation as described herein. For example, the pipeline validation manager 420 may include a pipeline manager 425, a metadata manager 430, a policy manager 435, or any combination thereof. Each of these components may communicate, directly or indirectly, with one another (e.g., via one or more buses).

The pipeline validation manager 420 may support managing metadata in accordance with examples as disclosed herein. The pipeline manager 425 may be configured as or otherwise support a means for executing a pipeline on a version of a codebase, the pipeline comprising one or more utilities corresponding to respective stages within the pipeline, wherein the version of the codebase is associated with an immutable identifier of a version control management system. The metadata manager 430 may be configured as or otherwise support a means for generating metadata for at least one utility of the one or more utilities of the pipeline based at least in part on executing the pipeline on the version of the codebase. In some examples, the metadata manager 430 may be configured as or otherwise support a means for storing the metadata at a database, wherein the immutable identifier is designated as a primary key for the stored metadata. In some examples, the metadata manager 430 may be configured as or otherwise support a means for verifying the metadata at one or more gates of the pipeline based at least in part on a comparison of the stored metadata to a set of policy information associated with the one or more gates.

In some examples, to support verifying the metadata, the metadata manager 430 may be configured as or otherwise support a means for retrieving at least the subset of metadata based at least in part on the immutable identifier. In some examples, to support verifying the metadata, the policy manager 435 may be configured as or otherwise support a means for comparing the subset of metadata to a corresponding subset of policy information for the one or more utilities, the respective stages, or both.

In some examples, the metadata manager 430 may be configured as or otherwise support a means for configuring a set of metadata parameters for each of the one or more utilities, the respective stages, or any combination thereof, wherein the metadata is generated based at least in part on the configured set of metadata parameters.

In some examples, the one or more utilities comprises a first utility corresponding to an application security testing stage of the pipeline. In some examples, the set of metadata parameters comprises vulnerability information associated with the application security testing stage. In some examples, the vulnerability information comprises a quantity of vulnerabilities, seventies respectively corresponding to the vulnerabilities, or both. In some examples, the one or more utilities comprises a set of utilities corresponding to a set of application security testing stages of the pipeline. In some examples, the vulnerability information comprises a security report associated with a report identifier, the set of utilities, the set of application security testing stages, or any combination thereof.

In some examples, the vulnerability information comprises an indication of whether a vulnerability scan associated with the application security testing stage was skipped. In some examples, the pipeline comprises a set of application testing stages comprising at least the application security testing stage. In some examples, the vulnerability information comprises an indication of skipped vulnerability scans associated with one or more application testing stages of the set of application testing stages. In some examples, the application security testing stage comprises a static application security testing stage, a dynamic application security testing stage, an interactive application security testing stage, runtime application security protection, software composition analysis, or any combination thereof.

In some examples, the one or more utilities comprises a second utility corresponding to one or more testing stages of the pipeline. In some examples, the set of metadata parameters comprises code coverage information associated with the one or more testing stages, the code coverage information comprising a quantity of tests performed, a quantity of tests passed, a quantity of tests skipped, a quantity of tests failed, or any combination thereof.

In some examples, the metadata manager 430 may be configured as or otherwise support a means for identifying the immutable identifier as the primary key for generating the metadata. In some examples, the metadata manager 430 may be configured as or otherwise support a means for retrieving the metadata or a subset of the metadata from the database based at least in part on an application command and the immutable identifier.

In some examples, the respective stages comprise one or more build stages, one or more testing stages, one or more code quality stages, one or more policy adherence stages, one or more scanning stages, one or more packaging stages, one or more deployment stages, one or more monitoring stages, or any combination thereof. In some examples, the pipeline comprises a continuous integration, continuous delivery, and/or continuous deployment pipeline.

Figure 5:
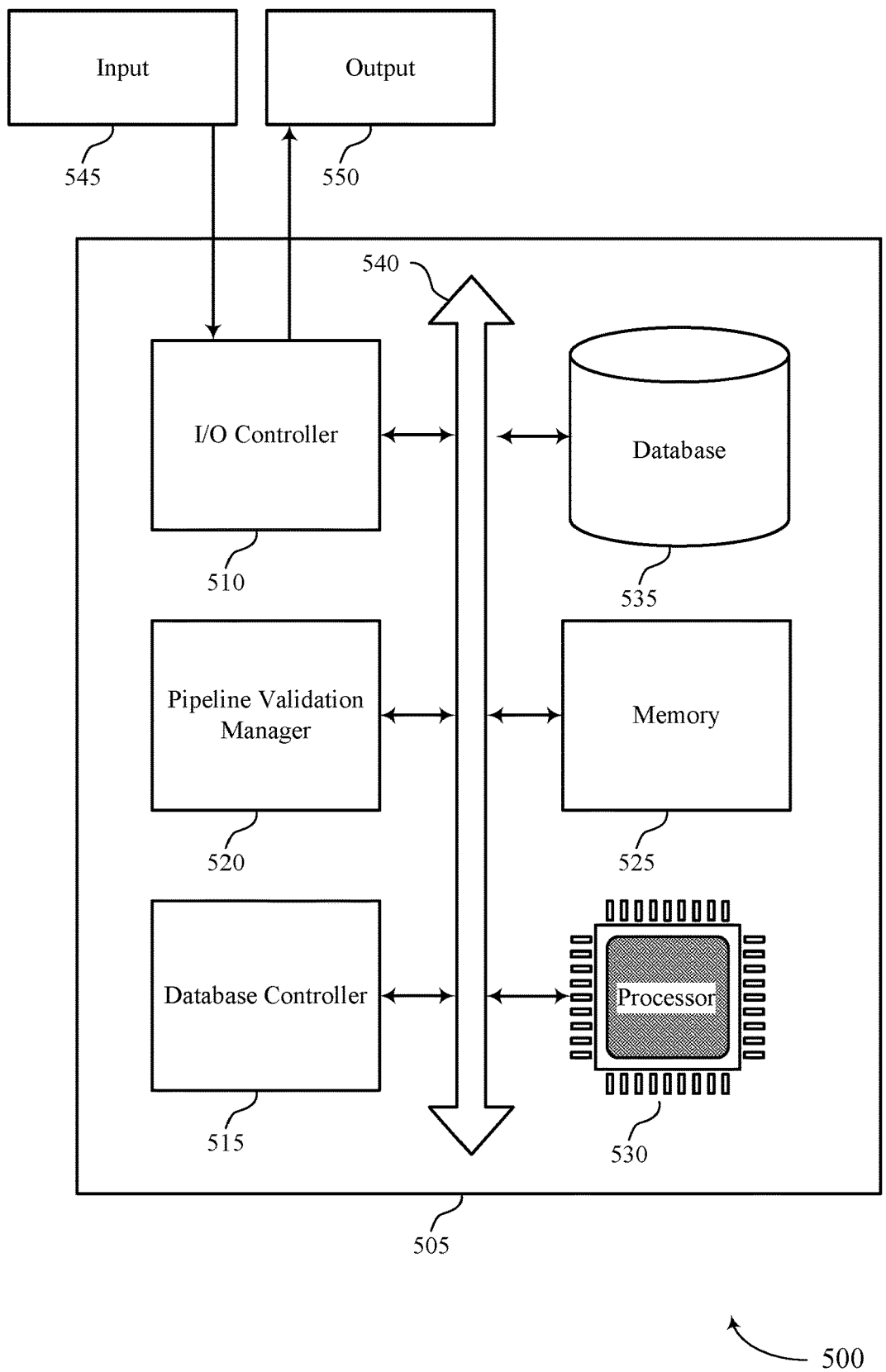
FIG. 5 shows a diagram of a system including a device that supports pipeline release validation in accordance with aspects of the present disclosure.

FIG. 5 shows a diagram of a system 500 including a device 505 that supports pipeline release validation in accordance with aspects of the present disclosure. The device 505 may be an example of or include the components of a device 305 as described herein. The device 505 may include components for bi-directional voice and data communications including components for transmitting and receiving communications, such as a pipeline validation manager 520, an I/O controller 510, a database controller 515, a memory 525, a processor 530, and a database 535. These components may be in electronic communication or otherwise coupled (e.g., operatively, communicatively, functionally, electronically, electrically) via one or more buses (e.g., a bus 540).

The I/O controller 510 may manage input signals 545 and output signals 550 for the device 505. The I/O controller 510 may also manage peripherals not integrated into the device 505. In some cases, the I/O controller 510 may represent a physical connection or port to an external peripheral. In some cases, the I/O controller 510 may utilize an operating system such as iOS®, ANDROID®, MS-DOS®, MS-WINDOWS®, OS/2®, UNIX®, LINUX®, or another known operating system. In other cases, the I/O controller 510 may represent or interact with a modem, a keyboard, a mouse, a touchscreen, or a similar device. In some cases, the I/O controller 510 may be implemented as part of a processor. In some cases, a user may interact with the device 505 via the I/O controller 510 or via hardware components controlled by the I/O controller 510.

The database controller 515 may manage data storage and processing in a database 535. In some cases, a user may interact with the database controller 515. In other cases, the database controller 515 may operate automatically without user interaction. The database 535 may be an example of a single database, a distributed database, multiple distributed databases, a data store, a data lake, or an emergency backup database.

Memory 525 may include random-access memory (RAM) and read-only memory (ROM). The memory 525 may store computer-readable, computer-executable software including instructions that, when executed, cause the processor to perform various functions described herein. In some cases, the memory 525 may contain, among other things, a basic input/output system (BIOS) which may control basic hardware or software operation such as the interaction with peripheral components or devices.

The processor 530 may include an intelligent hardware device, (e.g., a general-purpose processor, a digital signal processor (DSP), a CPU, a microcontroller, an ASIC, an field-programmable gate array (FPGA), a programmable logic device, a discrete gate or transistor logic component, a discrete hardware component, or any combination thereof). In some cases, the processor 530 may be configured to operate a memory array using a memory controller. In other cases, a memory controller may be integrated into the processor 530. The processor 530 may be configured to execute computer-readable instructions stored in a memory 525 to perform various functions (e.g., functions or tasks supporting pipeline release validation).

The pipeline validation manager 520 may support managing metadata in accordance with examples as disclosed herein. For example, the pipeline validation manager 520 may be configured as or otherwise support a means for executing a pipeline on a version of a codebase, the pipeline comprising one or more utilities corresponding to respective stages within the pipeline, wherein the version of the codebase is associated with an immutable identifier of a version control management system. The pipeline validation manager 520 may be configured as or otherwise support a means for generating metadata for at least one utility of the one or more utilities of the pipeline based at least in part on executing the pipeline on the version of the codebase. The pipeline validation manager 520 may be configured as or otherwise support a means for storing the metadata at a database, wherein the immutable identifier is designated as a primary key for the stored metadata. The pipeline validation manager 520 may be configured as or otherwise support a means for verifying the metadata at one or more gates of the pipeline based at least in part on a comparison of the stored metadata to a set of policy information associated with the one or more gates.

By including or configuring the pipeline validation manager 520 in accordance with examples as described herein, the device 505 may support techniques for publishing metadata about a particular deployment, where the metadata may be published to a centralized database that stores information traceable down to a particular version of the code (e.g., using git commit hash as a primary key). In addition, the pipeline validation manager 520 may support using metadata to implement policy as code, where deployments may automatically progress through to production, and an enterprise (e.g., a financial institution) may have confidence that the deployment aligns with any and all enterprise policies. Aspects of the functions performed by the pipeline validation manager 520 may support posting of data to create new entries and update metadata for a particular item, utility, or tool (e.g., within a pipeline).

Figure 6:
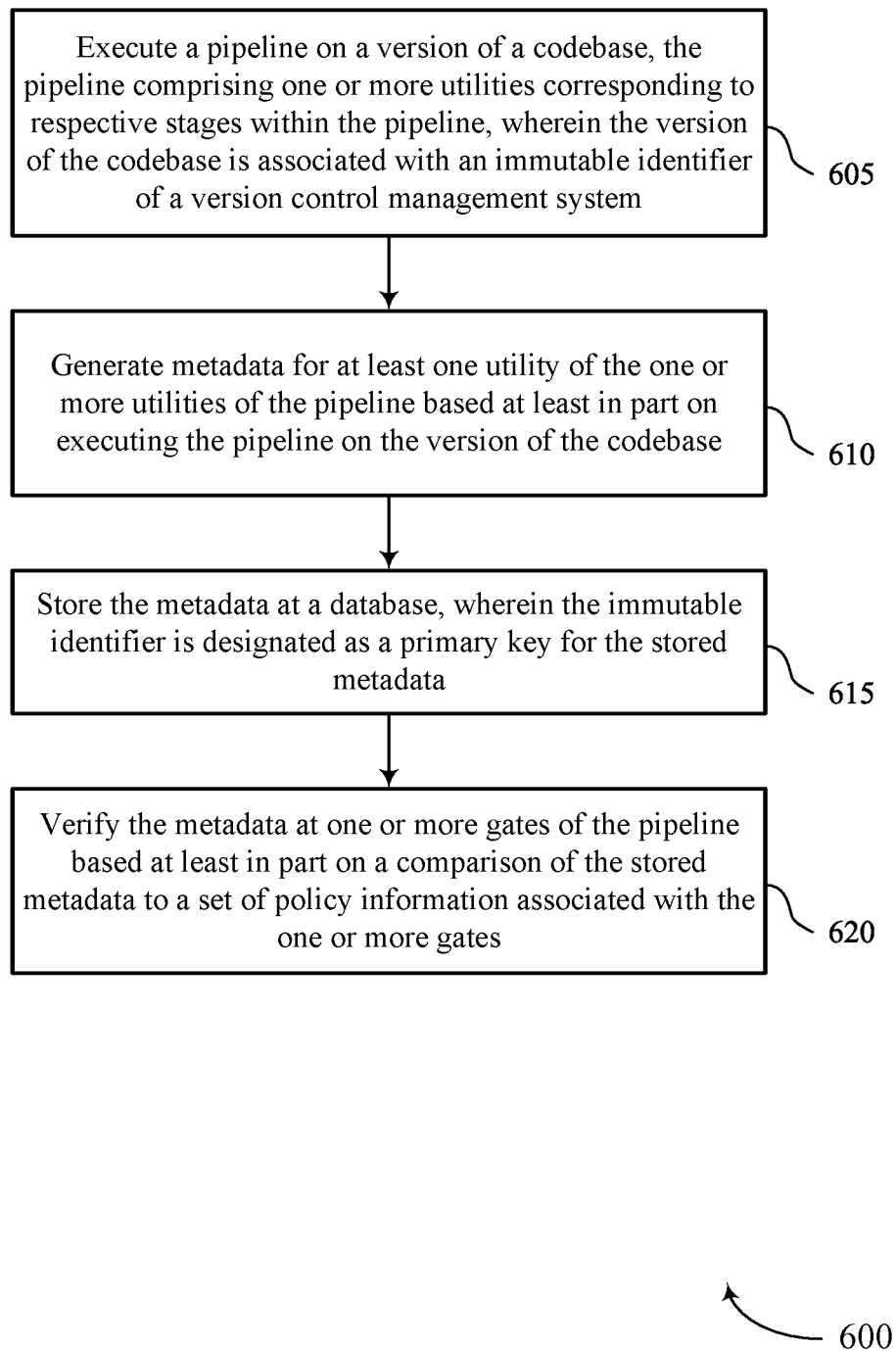
FIGS. 6 through 8 show flowcharts illustrating methods that support pipeline release validation in accordance with aspects of the present disclosure.

FIG. 6 shows a flowchart illustrating a method 600 that supports pipeline release validation in accordance with aspects of the present disclosure. The operations of the method 600 may be implemented by a device or its components as described herein. For example, the operations of the method 600 may be performed by a device as described with reference to FIGS. 1 through 5. In some examples, a device may execute a set of instructions to control the functional elements of the device to perform the described functions. Additionally or alternatively, the device may perform aspects of the described functions using special-purpose hardware.

At 605, the method may include executing a pipeline on a version of a codebase, the pipeline comprising one or more utilities corresponding to respective stages within the pipeline, wherein the version of the codebase is associated with an immutable identifier of a version control management system. The operations of 605 may be performed in accordance with examples as disclosed herein. In some examples, aspects of the operations of 605 may be performed by a pipeline manager 425 as described with reference to FIG. 4.

At 610, the method may include generating metadata for at least one utility of the one or more utilities of the pipeline based at least in part on executing the pipeline on the version of the codebase. The operations of 610 may be performed in accordance with examples as disclosed herein. In some examples, aspects of the operations of 610 may be performed by a metadata manager 430 as described with reference to FIG. 4.

At 615, the method may include storing the metadata at a database, wherein the immutable identifier is designated as a primary key for the stored metadata. The operations of 615 may be performed in accordance with examples as disclosed herein. In some examples, aspects of the operations of 615 may be performed by a metadata manager 430 as described with reference to FIG. 4.

At 620, the method may include verifying the metadata at one or more gates of the pipeline based at least in part on a comparison of the stored metadata to a set of policy information associated with the one or more gates. The operations of 620 may be performed in accordance with examples as disclosed herein. In some examples, aspects of the operations of 620 may be performed by a metadata manager 430 as described with reference to FIG. 4.

Figure 7:
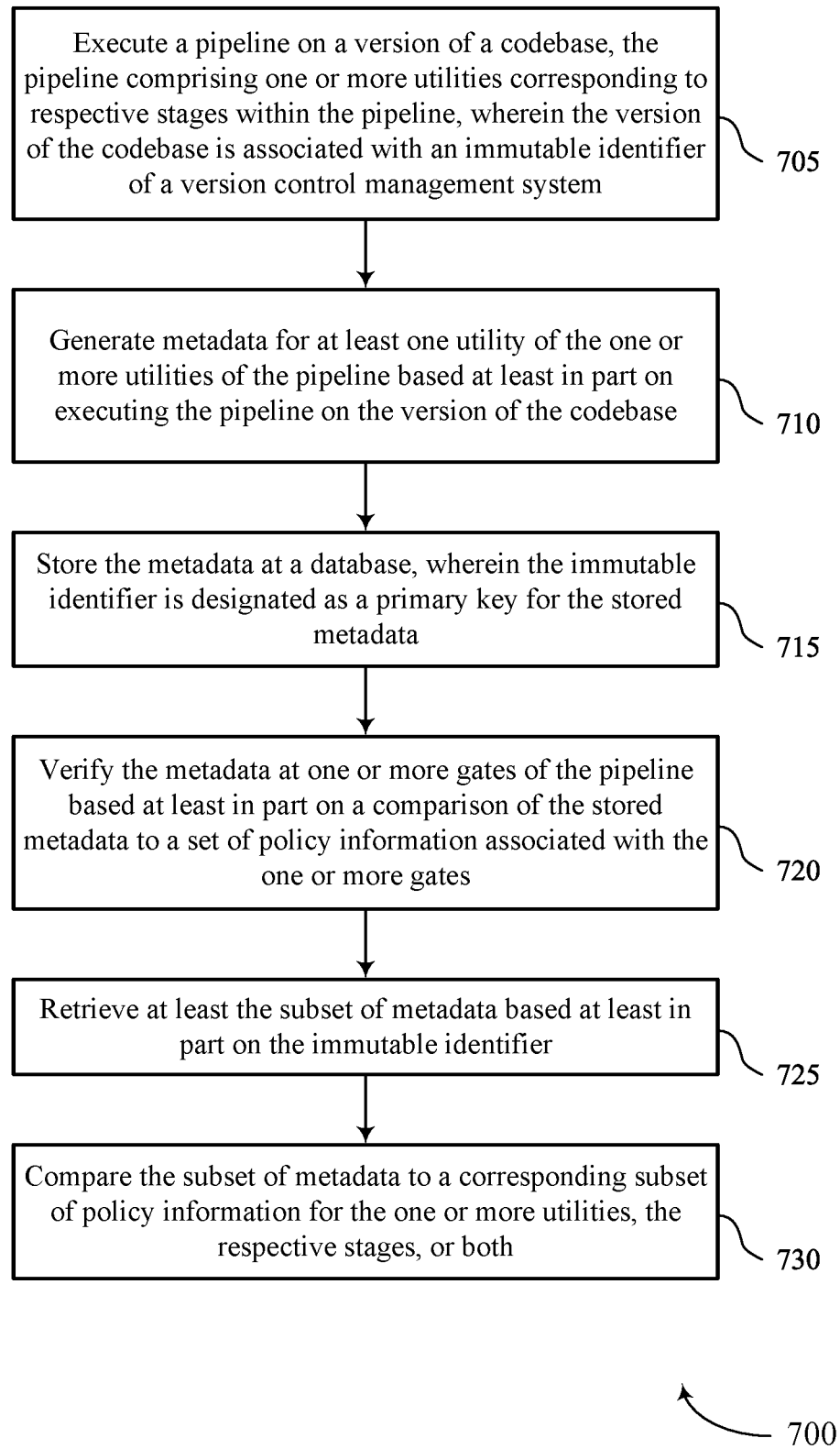

FIG. 7 shows a flowchart illustrating a method 700 that supports pipeline release validation in accordance with aspects of the present disclosure. The operations of the method 700 may be implemented by a device or its components as described herein. For example, the operations of the method 700 may be performed by a device as described with reference to FIGS. 1 through 5. In some examples, a device may execute a set of instructions to control the functional elements of the device to perform the described functions. Additionally or alternatively, the device may perform aspects of the described functions using special-purpose hardware.

At 705, the method may include executing a pipeline on a version of a codebase, the pipeline comprising one or more utilities corresponding to respective stages within the pipeline, wherein the version of the codebase is associated with an immutable identifier of a version control management system. The operations of 705 may be performed in accordance with examples as disclosed herein. In some examples, aspects of the operations of 705 may be performed by a pipeline manager 425 as described with reference to FIG. 4.

At 710, the method may include generating metadata for at least one utility of the one or more utilities of the pipeline based at least in part on executing the pipeline on the version of the codebase. The operations of 710 may be performed in accordance with examples as disclosed herein. In some examples, aspects of the operations of 710 may be performed by a metadata manager 430 as described with reference to FIG. 4.

At 715, the method may include storing the metadata at a database, wherein the immutable identifier is designated as a primary key for the stored metadata. The operations of 715 may be performed in accordance with examples as disclosed herein. In some examples, aspects of the operations of 715 may be performed by a metadata manager 430 as described with reference to FIG. 4.

At 720, the method may include verifying the metadata at one or more gates of the pipeline based at least in part on a comparison of the stored metadata to a set of policy information associated with the one or more gates. The operations of 720 may be performed in accordance with examples as disclosed herein. In some examples, aspects of the operations of 720 may be performed by a metadata manager 430 as described with reference to FIG. 4.

At 725, the method may include retrieving at least the subset of metadata based at least in part on the immutable identifier. The operations of 725 may be performed in accordance with examples as disclosed herein. In some examples, aspects of the operations of 725 may be performed by a metadata manager 430 as described with reference to FIG. 4.

At 730, the method may include comparing the subset of metadata to a corresponding subset of policy information for the one or more utilities, the respective stages, or both. The operations of 730 may be performed in accordance with examples as disclosed herein. In some examples, aspects of the operations of 730 may be performed by a policy manager 435 as described with reference to FIG. 4.

Figure 8:
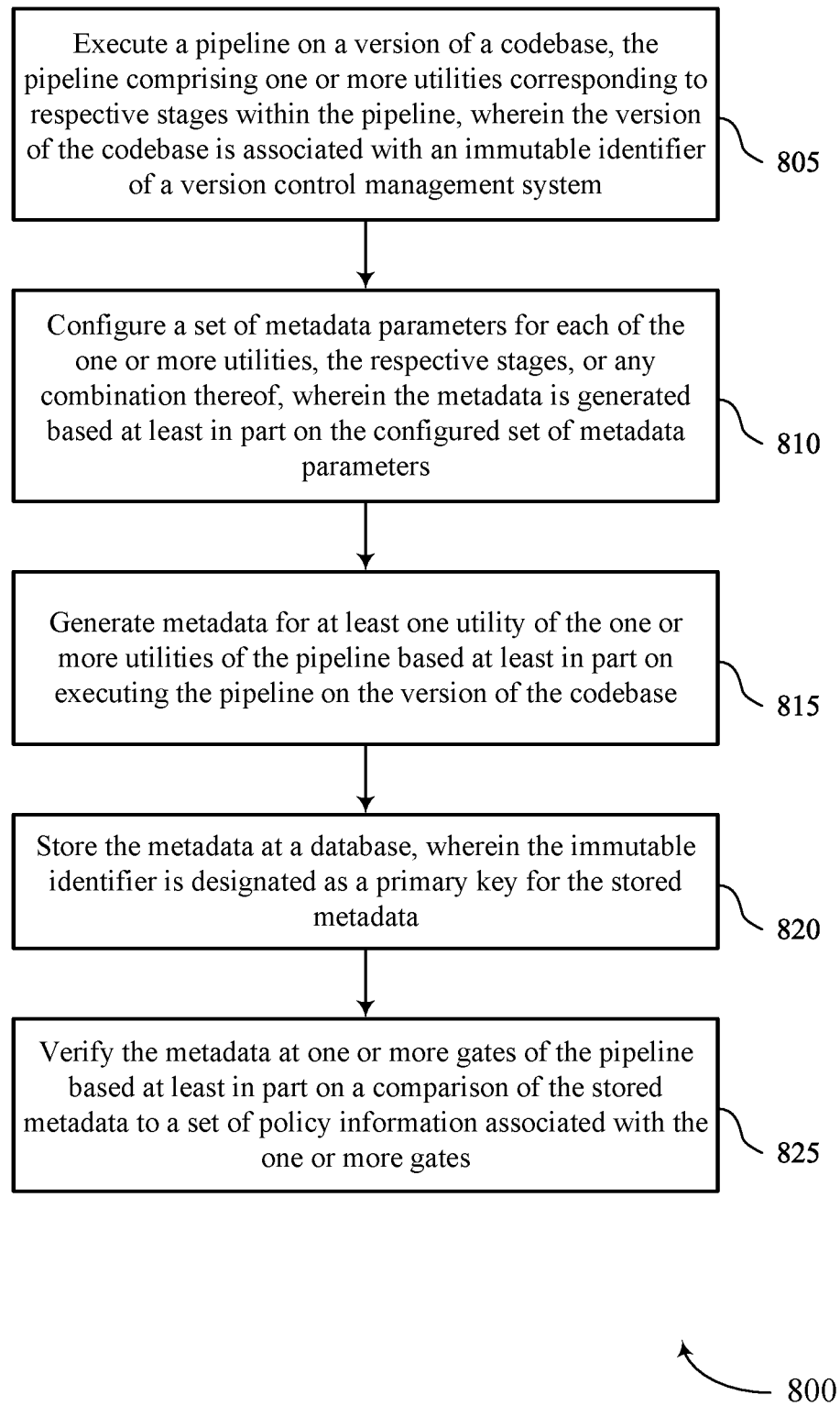

FIG. 8 shows a flowchart illustrating a method 800 that supports pipeline release validation in accordance with aspects of the present disclosure. The operations of the method 800 may be implemented by a device or its components as described herein. For example, the operations of the method 800 may be performed by a device as described with reference to FIGS. 1 through 5. In some examples, a device may execute a set of instructions to control the functional elements of the device to perform the described functions. Additionally or alternatively, the device may perform aspects of the described functions using special-purpose hardware.

At 805, the method may include executing a pipeline on a version of a codebase, the pipeline comprising one or more utilities corresponding to respective stages within the pipeline, wherein the version of the codebase is associated with an immutable identifier of a version control management system. The operations of 805 may be performed in accordance with examples as disclosed herein. In some examples, aspects of the operations of 805 may be performed by a pipeline manager 425 as described with reference to FIG. 4.

At 810, the method may include configuring a set of metadata parameters for each of the one or more utilities, the respective stages, or any combination thereof, wherein the metadata is generated based at least in part on the configured set of metadata parameters. The operations of 810 may be performed in accordance with examples as disclosed herein. In some examples, aspects of the operations of 810 may be performed by a metadata manager 430 as described with reference to FIG. 4.

At 815, the method may include generating metadata for at least one utility of the one or more utilities of the pipeline based at least in part on executing the pipeline on the version of the codebase. The operations of 815 may be performed in accordance with examples as disclosed herein. In some examples, aspects of the operations of 815 may be performed by a metadata manager 430 as described with reference to FIG. 4.

At 820, the method may include storing the metadata at a database, wherein the immutable identifier is designated as a primary key for the stored metadata. The operations of 820 may be performed in accordance with examples as disclosed herein. In some examples, aspects of the operations of 820 may be performed by a metadata manager 430 as described with reference to FIG. 4.

At 825, the method may include verifying the metadata at one or more gates of the pipeline based at least in part on a comparison of the stored metadata to a set of policy information associated with the one or more gates. The operations of 825 may be performed in accordance with examples as disclosed herein. In some examples, aspects of the operations of 825 may be performed by a metadata manager 430 as described with reference to FIG. 4.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing metadata, comprising:
executing a pipeline on a version of a codebase, the pipeline comprising one or more utilities corresponding to respective stages within the pipeline, wherein the version of the codebase is associated with an immutable identifier of a version control management system, and wherein the immutable identifier is based at least in part on a hashing function on the version of the codebase;
generating a first subset of metadata for a first utility of the one or more utilities of the pipeline based at least in part on executing the pipeline on the version of the codebase;
generating a second subset of metadata for a second utility of the one or more utilities of the pipeline based at least in part on executing the pipeline on the version of the codebase, wherein the first utility corresponds to a first stage and the second utility corresponds to a second stage different from the first stage;

generating a data structure comprising the first subset of metadata and the second subset of metadata and the immutable identifier;

storing the data structure at a database, wherein the immutable identifier is designated as a primary key for the stored metadata; and verifying the first subset of metadata and the second subset of metadata at one or more gates of the pipeline based at least in part on a comparison of the stored metadata to a set of policy information associated with the one or more gates.

2. The method of claim 1, wherein the metadata comprises the first subset of metadata associated with the first utility of the one or more utilities, and wherein verifying the metadata comprises:

retrieving at least the first subset of metadata based at least in part on the immutable identifier; and comparing the first subset of metadata to a corresponding subset of policy information for the one or more utilities, the respective stages, or both.

3. The method of claim 1, further comprising:

configuring a set of metadata parameters for each of the one or more utilities, the respective stages, or any combination thereof, wherein the metadata is generated based at least in part on the configured set of metadata parameters.

4. The method of claim 3, wherein:

the one or more utilities comprises the first utility corresponding to an application security testing stage of the pipeline; and the set of metadata parameters comprises vulnerability information associated with the application security testing stage.

5. The method of claim 4, wherein the vulnerability information comprises a quantity of vulnerabilities, severities respectively corresponding to the vulnerabilities, or both.

6. The method of claim 4, wherein:

the one or more utilities comprises a set of utilities corresponding to a set of application security testing stages of the pipeline; and the vulnerability information comprises a security report associated with a report identifier, the set of utilities, the set of application security testing stages, or any combination thereof.

7. The method of claim 4, wherein the vulnerability information comprises an indication of whether a vulnerability scan associated with the application security testing stage was skipped.

8. The method of claim 4, wherein:

the pipeline comprises a set of application testing stages comprising at least the application security testing stage; and the vulnerability information comprises an indication of skipped vulnerability scans associated with one or more application testing stages of the set of application testing stages.

9. The method of claim 4, wherein the application security testing stage comprises a static application security testing stage, a dynamic application security testing stage, an interactive application security testing stage, runtime application security protection, software composition analysis, or any combination thereof.

10. The method of claim 4, wherein:

the one or more utilities comprises the second utility corresponding to one or more testing stages of the pipeline; and the set of metadata parameters comprises code coverage information associated with the one or more testing stages, the code coverage information comprising a quantity of tests performed, a quantity of tests passed, a quantity of tests skipped, a quantity of tests failed, or any combination thereof.

11. The method of claim 1, further comprising:

identifying the immutable identifier as the primary key for generating the metadata.

12. The method of claim 1, further comprising:

retrieving the metadata or a subset of the metadata from the database based at least in part on an application command and the immutable identifier.

13. The method of claim 1, wherein the respective stages comprise one or more build stages, one or more testing stages, one or more code quality stages, one or more policy adherence stages, one or more scanning stages, one or more packaging stages, one or more deployment stages, one or more monitoring stages, or any combination thereof.

14. The method of claim 1, wherein the pipeline comprises a continuous integration pipeline, a continuous delivery pipeline, a continuous deployment pipeline, or any combination thereof.

15. An apparatus for managing metadata, comprising:

a processor;

memory coupled with the processor; and instructions stored in the memory and executable by the processor to cause the apparatus to:

execute a pipeline on a version of a codebase, the pipeline comprising one or more utilities corresponding to respective stages within the pipeline, wherein the version of the codebase is associated with an immutable identifier of a version control management system, and wherein the immutable identifier is based at least in part on a hashing function on the version of the codebase;

generate a first subset of metadata for a first utility of the one or more utilities of the pipeline based at least in part on executing the pipeline on the version of the codebase;

generate a second subset of metadata for a second utility of the one or more utilities of the pipeline based at least in part on executing the pipeline on the version of the codebase, wherein the first utility corresponds to a first stage and the second utility corresponds to a second stage different from the first stage;

generate a data structure comprising the first subset of metadata and the second subset of metadata and the immutable identifier;

store the data structure at a database, wherein the immutable identifier is designated as a primary key for the stored metadata; and verify the first subset of metadata and the second subset of metadata at one or more gates of the pipeline based at least in part on a comparison of the stored metadata to a set of policy information associated with the one or more gates.

16. The apparatus of claim 15, wherein the metadata comprises the first subset of metadata associated with the first utility of the one or more utilities, and wherein the instructions to verify the metadata are executable by the processor to cause the apparatus to:

retrieve at least the first subset of metadata based at least in part on the immutable identifier; and compare the first subset of metadata to a corresponding subset of policy information for the one or more utilities, the respective stages, or both.

17. The apparatus of claim 15, wherein the instructions are further executable by the processor to cause the apparatus to:

configure a set of metadata parameters for each of the one or more utilities, the respective stages, or any combination thereof, wherein the metadata is generated based at least in part on the configured set of metadata parameters.

18. The apparatus of claim 17, wherein:

the one or more utilities comprises the first utility corresponding to an application security testing stage of the pipeline; and the set of metadata parameters comprises vulnerability information associated with the application security testing stage.

19. The apparatus of claim 18, wherein the vulnerability information comprises a quantity of vulnerabilities, severities respectively corresponding to the vulnerabilities, or both.

20. A non-transitory computer-readable medium storing code for managing metadata, the code comprising instructions executable by a processor to:

execute a pipeline on a version of a codebase, the pipeline comprising one or more utilities corresponding to respective stages within the pipeline, wherein the version of the codebase is associated with an immutable identifier of a version control management system, and wherein the immutable identifier is based at least in part on a hashing function on the version of the codebase;

generate a first subset of metadata for a first utility of the one or more utilities of the pipeline based at least in part on executing the pipeline on the version of the codebase;

generate a second subset of metadata for a second utility of the one or more utilities of the pipeline based at least in part on executing the pipeline on the version of the codebase, wherein the first utility corresponds to a first stage and the second utility corresponds to a second stage different from the first stage;

generate a data structure comprising the first subset of metadata and the second subset of metadata and the immutable identifier;

store the data structure at a database, wherein the immutable identifier is designated as a primary key for the stored metadata; and verify the first subset of metadata and the second subset of metadata at one or more gates of the pipeline based at least in part on a comparison of the stored metadata to a set of policy information associated with the one or more gates.

* * * * *